March 19, 1963     H. EHMS     3,081,602
PRESSURE VESSEL

Filed Oct. 16, 1959     4 Sheets-Sheet 1

Inventor
Hermann Ehms,
By Pierce, Scheffler & Parker
his Attorneys

United States Patent Office 3,081,602
Patented Mar. 19, 1963

3,081,602
PRESSURE VESSEL
Hermann Ehms, Munich-Solln, Germany, assignor to Gesellschaft für Linde's Eismaschinen Aktiengesellschaft, Hollriegelskreuth, near Munich, Germany, a company of Germany
Filed Oct. 16, 1959, Ser. No. 846,834
Claims priority, application Germany Oct. 18, 1958
5 Claims. (Cl. 62—55)

The present invention relates to the art of handling liquefied gases in closed pressure vessel, and is concerned with the provision of improved means for controlling liquid pressure within closed pressure vessels or tanks.

When storing and shipping liquefied gases in closed pressure vessels it has to be kept in mind that the volume of the liquid increases with rising temperature. As soon as the liquid fills the interior of the vessel completely, any further temperature increase results in a rapid increase of the liquid pressure and can thus lead to destruction of the vessel. This danger had been previously avoided by providing, during the filling of the vessel, sufficient space for the temperature-dependent expansion of the liquid. This measure, however, permitted only a limited utilization of the volume of the vessel.

An object of the present invention is to solve the problem of achieving a good utilization of the vessel's volume and at the same time a reliable security against liquid pressure in closed pressure vessels for liquefied gases whose boiling point within the vessel is below the ambient temperature. To this end, the invention provides a pressure vessel for liquefied gases wherein a pressure increase can be achieved by conducting a small portion of the liquid into an evaporator and introducing the gas so produced there into the gas chamber of the vessel which is characterized by an automatic safety device against liquid pressure in the form of an overflow arranged at the critical level which the liquid must not surpass for safety reasons, which safety device is connected over the evaporator with the gas chamber provided in known manner with a safety valve.

The process of producing a pressure increase in the pressure vessel by conducting liquid into an evaporator and returning the so-formed gases into the vessel is known per se; it is used in the production of pressure gas, for example, by means of the so-called pressure attachment, for accelerating the passage of liquefied gases from a storage tank into another tank. The present invention includes the utilization of such a device, if necessary, the above-mentioned pressure attachment, to provide automatic safety against liquid pressure with low additional costs.

Figure 1:
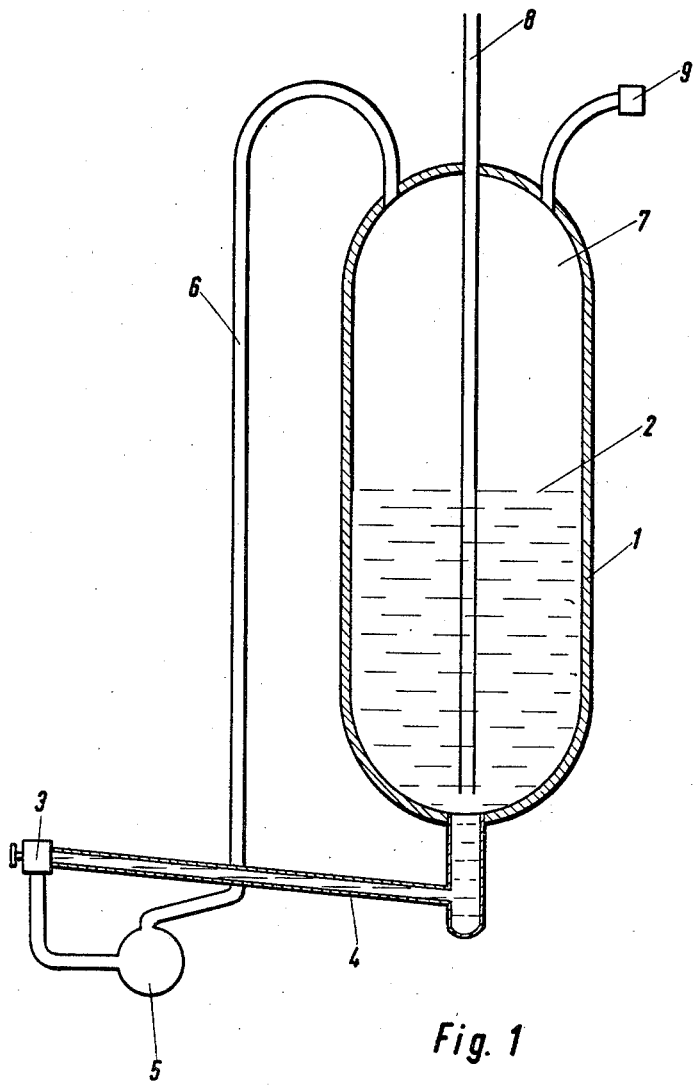

The invention will be described more fully on the basis of the attached drawing, where the same parts are designated with the same reference numbers. FIG. 1 shows a vessel with a generally known pressure attachment. The pressure vessel 1 is filled with liquefied gas, for example, up to the level 2. If liquefied gas is to be delivered to a consumer, a portion of liquid is discharged from the tank 1 through the valve 3 into the evaporator 5 where it evaporates. The gas so formed is introduced through the return gas conduit 6 into the gas chamber 7 of the vessel and increases the pressure there, so that liquid is pressed upward in the pipe 8 and flows through the latter to the consumer's equipment. The vessel is protected against excessive pressure by a safety valve 9.

Figure 2:
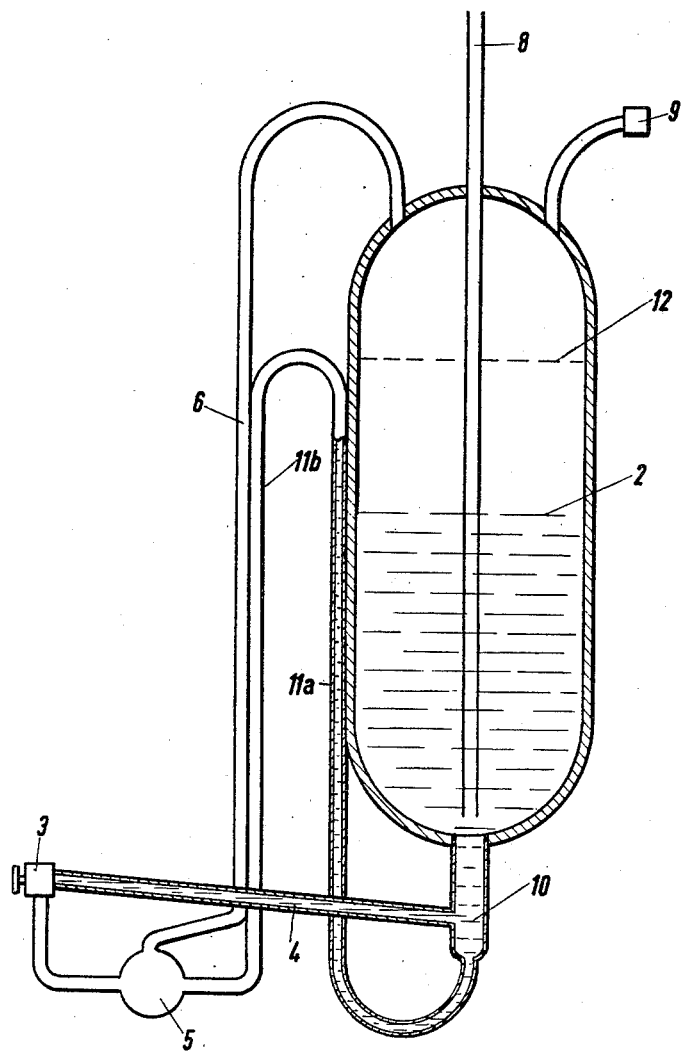

An embodiment of the present invention is represented by way of example in FIG. 2. In the embodiment shown in FIG. 2, there is branched off from the pipe 10, inserted in the vessel's bottom, a pipe 11a which is conducted upwardly outside along the vessel's wall, to the critical level 12 which the liquid must not exceed under any circumstances: here the pipe 11a forms an overflow, bends and opens as pipe 11b into the evaporator 5. When the liquefied gas has reached the critical level 12, it flows through the pipes 11a and 11b respectively, into the evaporator 5, where it evaporates. The gas so formed produces in the gas chamber 7 an overpressure by which the safety valve 9 is actuated.

The production of a liquid pressure is positively avoided by means of this automatic device, since the liquid can never rise higher than corresponds to the critical level 12. It is, therefore, no longer necessary to fill the vessel (or tank) only so far that the liquid cannot increase under any circumstances until a liquid pressure appears. Thus a considerably better utilization of the volume of the pressure vessel has become possible, which brings considerable economical advantages.

Figure 3:
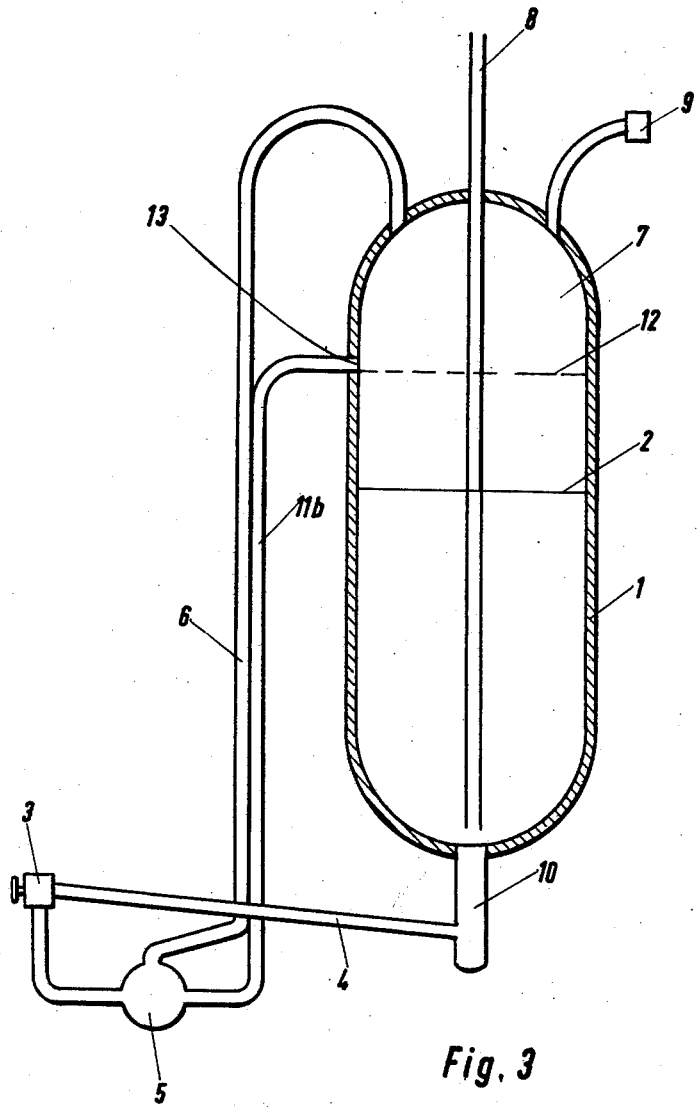

FIG. 3 shows another embodiment of the safety device. The overflow is formed here by an orifice 13 at the critical level in vessel 1, through which orifice pipe 11b communicates between gas chamber 7 and evaporator 5.

Figure 4:
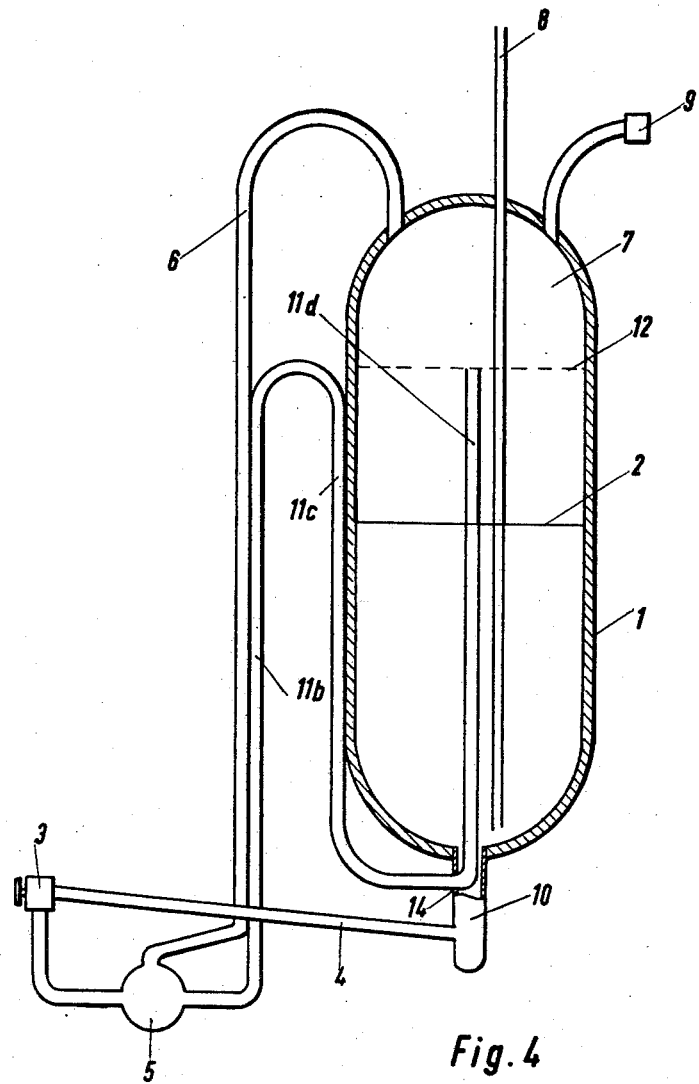

In a third embodiment according to FIG. 4, a pipe 11c is introduced at 14 into the pipe 10, which pipe 11c extends then in the represented manner through the center of the vessel's bottom and, as pipe 11d, reaches inside the vessel the critical level 12. The same effect is achieved if the pipes 10 and 11 are conducted not one inside the other but side by side out of the vessel's bottom.

The dependability of the device according to FIG. 2 and FIG. 4 respectively is increased by the fact that the small amount of liquid in the pipe 11a and pipe 11c respectively is heated more rapidly by heat supply from the outside than is the liquid in the vessel. Since the specific gravity of the liquid in the pipe is slightly lower for this reason than that of the liquid in the vessel, the equilibrium levels are established in the manner indicated in FIG. 2 by hatching. The liquid in the pipe 11a and pipe 11c respectively reaches the overflow level shortly before the liquid level 2, so that the latter cannot quite rise at the critical level 12.

Excessive heating of the liquid in the pipe 11a and pipe 11c respectively would mean, however, that the liquid already flow off through the overflow when the liquid level 2 is still far below the critical level 12. It is, therefore, of advantage to keep the pipe 11a and pipe 11c respectively in as close contact as is possible with the outer wall of the tank up to the critical level 12, in order to prevent an excessive temperature rise in the pipe.

Furthermore, it is of advantage to keep the pipes 6 and 11b in the embodiments according to FIGURES 2 to 4, inclusive, as close as possible side by side, in order to minimize the temperature difference between the gas columns therein as well as possible. If the gas in the pipe 11b is too cold it will drop, due to its gravity, into the evaporator 5, will be heated there, and will force the warmer gas from the pipe 6 into the gas chamber 7, while cold gas will flow into the pipe 11b. These losses by heat circulation can be prevented to a great extent by means of the above-described measure.

In the embodiment according to FIG. 2 the pipes 6 and 11b should be laid outside the insulation and not too close, respectively, to the pressure vessel 1, so that overflowing liquid can be mixed immediately with sufficient gas to avoid any syphon effect, which could appear once the supercooled liquid in the vessel 1 has started to escape through the overflow. In this case the discharge could continue until the vessel were completely empty. Other known measures, such as heating the upper apex, can also be provided.

I claim:

1. Transport and storage tank for low-boiling liquefied gases with a pressure attachment for discharging liquid gas, said pressure attachment consisting in a known way of an evaporator the under part of which is in connection with the undermost part of said tank by way of a control-valve and the upper part of which evaporator is in direct connection with the upper part of said tank, characterized by the provision of an automatic safety device against high pressure by temperature-extension of the liquid, said device consisting of a direct overflow conduit from said tank (1), at its critical level (12) which the liquid is not allowed to surpass, to said evaporator (5), further characterized in that part (11b) of said direct overflow conduit extending from the height of said critical level (12) exteriorly of said tank (1) to said evaporator (5) is disposed in direct heat-conductive contact with said connective conduit (6) from said evaporator (5) to said upper part of said tank (1).

2. Transport and storage tank for low-boiling liquefied gases with a pressure attachment for discharging liquid gas, said pressure attachment consisting in a known way of an evaporator the under part of which is in connection with the undermost part of said tank by way of a control valve and the upper part of which evaporator is in direct connection with the upper part of said tank, characterized by the provision of an automatic safety device against high pressure by temperature-extension of the liquid, said device consisting of a direct overflow conduit extending (11a) from an opening in the bottom of said tank exteriorly of the latter to its said critical level which the liquid is not allowed to surpass, and from there (11b) to said evaporator (5), further characterized in that said part (11a) of said direct overflow conduit extending exteriorly of said tank (1) from its bottom to its said critical level (12) is disposed in direct heat-conductive contact with the tank wall.

3. Transport and storage tank for low-boiling liquefied gases with a pressure attachment for discharging liquid gas, said pressure attachment consisting in a known way of an evaporator the under part of which is in connection with the undermost part of said tank by way of a control-valve and the upper part of which evaporator is in direct connection with the upper part of said tank, characterized by the provision of an automatic safety device against high pressure by temperature-extension of the liquid, said device consisting of a direct overflow conduit from said tank (1) at its critical level (12) which the liquid is not allowed to surpass, to said evaporator (5), said direct overflow conduit (11a, 11b) extending from an opening in the bottom of said tank (1) exteriorly of the latter to its said critical level (12) being disposed in direct heat-conductive contact with the tank wall and (11b) from said critical level to said evaporator (5), being disposed in direct heat-conductive contact with said connection conduit (6) from said evaporator (5) to said upper part of said tank (1).

4. Transport and storage tank for low-boiling liquefied gases with a pressure attachment for discharging liquid gas, said pressure attachment consisting in a known way of an evaporator the under part of which is in connection with the undermost part of said tank by way of a control valve and the upper part of which evaporator is in direct connection with the upper part of said tank, characterized by the provision of an automatic safety device against high pressure by temperature-extension of the liquid, said device consisting of a direct overflow conduit extending inside (11d) said tank from said critical level (12) through the bottom of said tank, from there exteriorly (11c) of said tank to said critical level (12) and from there to said evaporator (5), further characterized in that part (11c) of said direct overflow conduit extending exteriorly of said tank (1) from its bottom to its said critical level (12) is disposed in direct heat-conductive contact with the tank wall.

5. Transport and storage tank for low-boiling liquefied gases with a pressure attachment for discharging liquid gas, said pressure attachment consisting in a known way of an evaporator the under part of which is in connection with the undermost part of said tank by way of a control-valve and the upper part of which evaporator is in direct connection with the upper part of said tank characterized by the provision of an automatic safety device against high pressure by temperature-extension of the liquid, said device consisting of a direct overflow conduit from said tank (1) at its critical level (12) which the liquid is not allowed to surpass, to said evaporator (5), said direct overflow conduit (11d, 11c, 11b) extending inside (11d) said tank from said critical level (12) through the bottom of said tank, from there exteriorly (11c) of said tank to said critical level (12) being disposed in direct heat-conductive contact with the tank wall and (11b) from said critical level to said evaporator (5), being disposed in direct heat-conductive contact with said connection conduit (6) from said evaporator (5) to said upper part of said tank (1).

References Cited in the file of this patent

UNITED STATES PATENTS

| | | |
|---|---|---|
| 2,195,387 | Schlumbohm | Mar. 26, 1940 |
| 2,260,357 | Zenner | Oct. 28, 1941 |
| 2,576,984 | Wildhack | Dec. 4, 1951 |
| 2,705,873 | Bonnaud | Apr. 12, 1955 |